(12) United States Patent
Kang et al.

(10) Patent No.: US 9,766,504 B2
(45) Date of Patent: Sep. 19, 2017

(54) DISPLAY DEVICE

(71) Applicant: Samsung Display Co., Ltd., Yongin (KR)

(72) Inventors: Min Soo Kang, Asan-si (KR); Beomjun Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/730,922

(22) Filed: Jun. 4, 2015

(65) Prior Publication Data

US 2016/0018707 A1    Jan. 21, 2016

(30) Foreign Application Priority Data

Jul. 18, 2014   (KR) .......................... 10-2014-0091225

(51) Int. Cl.
| | | |
|---|---|---|
| *G02F 1/1333* | (2006.01) | |
| *G02F 1/1339* | (2006.01) | |
| *G02F 1/1362* | (2006.01) | |
| *G02F 1/1335* | (2006.01) | |

(52) U.S. Cl.
CPC ...... *G02F 1/1339* (2013.01); *G02F 1/133512* (2013.01); *G02F 1/136204* (2013.01); *G02F 2001/133334* (2013.01)

(58) Field of Classification Search
CPC ................. G02F 1/13452; G02F 1/136204
See application file for complete search history.

(56) References Cited

U.S. PATENT DOCUMENTS

| | | | |
|---|---|---|---|
| 7,969,537 B2* | 6/2011 | Pan | G02F 1/136204 349/110 |
| 8,174,635 B2 | 5/2012 | Kim et al. | |
| 9,316,859 B2* | 4/2016 | Shin | G02F 1/133512 |
| 2006/0068082 A1 | 3/2006 | Marra et al. | |
| 2007/0052904 A1* | 3/2007 | Yamada | G02F 1/1345 349/149 |
| 2010/0182524 A1* | 7/2010 | Nomura | G02F 1/133308 349/40 |
| 2011/0102719 A1* | 5/2011 | Kakehi | G02F 1/134363 349/122 |
| 2013/0088672 A1 | 4/2013 | Shin et al. | |
| 2013/0141687 A1* | 6/2013 | Wang | G02F 1/133512 349/158 |

FOREIGN PATENT DOCUMENTS

| | | |
|---|---|---|
| JP | 2010-107945 | 5/2010 |
| JP | 2012-093622 | 5/2012 |

(Continued)

*Primary Examiner* — Phu Vu
(74) *Attorney, Agent, or Firm* — H.C. Park & Associates, PLC

(57) ABSTRACT

A display device includes an array substrate, an opposite substrate, a printed circuit board, and a conductive member. The array substrate includes pixel electrodes. The opposite substrate faces the array substrate, is coupled with array substrate, and includes a light blocking layer disposed in a non-pixel area of the array substrate. The printed circuit board includes a ground terminal and output terminals to apply a driving signal to the array substrate through the output terminals. The conductive member electrically connects the light blocking layer to the ground terminal.

14 Claims, 6 Drawing Sheets

(56) References Cited

FOREIGN PATENT DOCUMENTS

| | | |
|---|---|---|
| JP | 2012-215764 | 11/2012 |
| KR | 1998-031816 | 7/1998 |
| KR | 10-2009-0010318 | 1/2009 |
| KR | 10-2012-0016535 | 2/2012 |
| KR | 10-2013-0083151 | 7/2013 |
| KR | 10-1363670 | 2/2014 |

* cited by examiner

DISPLAY DEVICE

CROSS-REFERENCE TO RELATED APPLICATION

This application claims priority from and the benefit of Korean Patent Application No. 10-2014-0091225, filed on Jul. 18, 2014, the contents of which are hereby incorporated by reference for all purposes as if fully set forth herein.

BACKGROUND

Field

Exemplary embodiments of the present disclosure relate to a display device. More particularly, exemplary embodiments of the present disclosure relate to a display device having an improved reliability.

Discussion of the Background

A liquid crystal display may typically include an array substrate, an opposite substrate facing the array substrate and being coupled to the array substrate, and a liquid crystal layer interposed between the array substrate and the opposite substrate. The array substrate may include gate lines, data lines, and pixels, each pixel being electrically connected to a corresponding gate line of the gate lines and a corresponding data line of the data lines. Each of the pixels may include a thin film transistor and a pixel electrode electrically connected to the thin film transistor. The thin film transistor may switch based on a data signal applied to the pixel electrode. The opposite substrate may include a common electrode. The common electrode may form an electric field with the pixel electrode to control an alignment direction of liquid crystal molecules of the liquid crystal layer.

When the common electrode is disposed on the array substrate together with the pixel electrode, which is different from the above-described structure of the liquid crystal display, the pixel electrode may be insulated from the common electrode and a plurality of slits may be formed in the pixel electrode. According to this structure, a horizontal electric field may be formed between the pixel electrode and the common electrode and transmitted through the slits.

When the pixel electrode and the common electrode are disposed on the array substrate of the liquid crystal display, a conductive layer is disposed on the opposite substrate. In this case, it is difficult to discharge built-up electric charges through the opposite substrate while the opposite substrate is manufactured. As a result, a reliability of the liquid crystal display may be deteriorated due to the electric charges built up in the opposite substrate.

SUMMARY

Exemplary embodiments of the present invention provide a display device having an improved reliability against static electricity.

Additional features of the invention will be set forth in the description which follows, and in part will be apparent from the description, or may be learned by practice of the invention.

An exemplary embodiment of the present invention discloses a display device including an array substrate, an opposite substrate, a printed circuit board, and a conductive member. The array substrate includes a plurality of pixel electrodes. The opposite substrate faces the array substrate, is coupled to the array substrate, and includes a light blocking layer corresponding to a non-pixel area of the array substrate. The printed circuit board includes a ground terminal and output terminals and applies a driving signal to the array substrate through the output terminals. The conductive member electrically connects the light blocking layer to the ground terminal.

According to the above, although electric charges are charged in the substrate of the display device, the electric charges are discharged to the ground terminal of the printed circuit board using the conductive member. Therefore, the layers of the display device may be prevented from being burnt by the static electricity caused by the electric charges formed in the substrate, and thus, improving the reliability of the display device.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
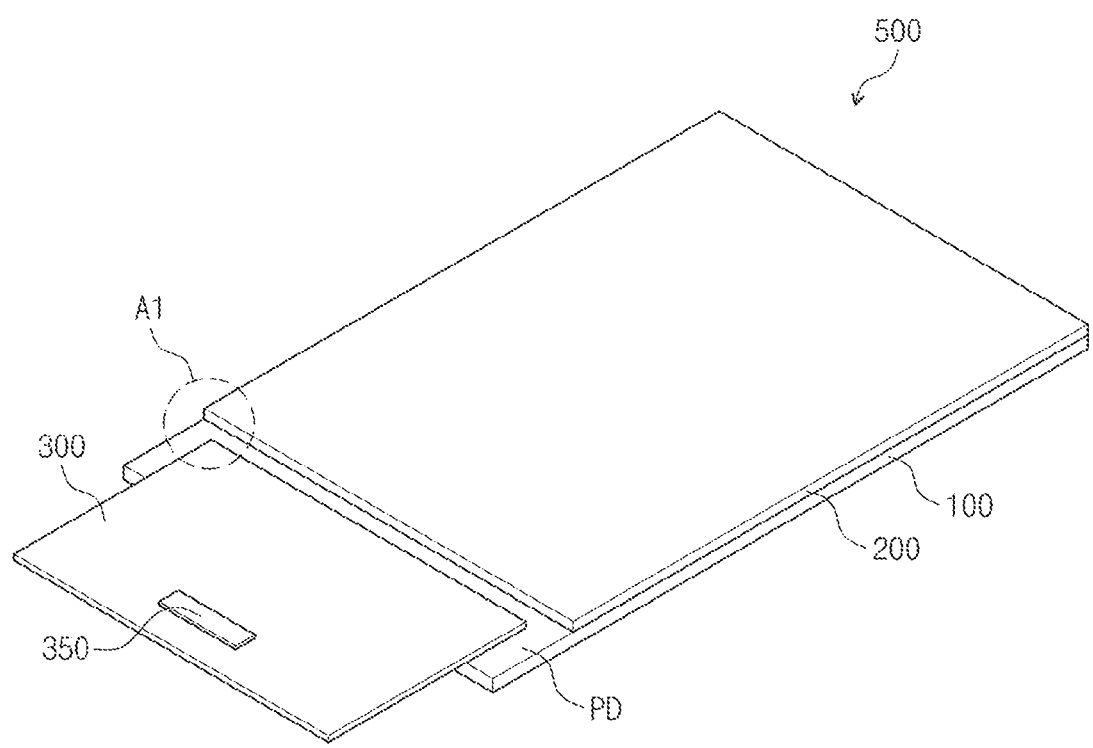
FIG. 1 is a perspective view showing a liquid crystal display according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be explained in detail with reference to the accompanying drawings.

Figure 2:
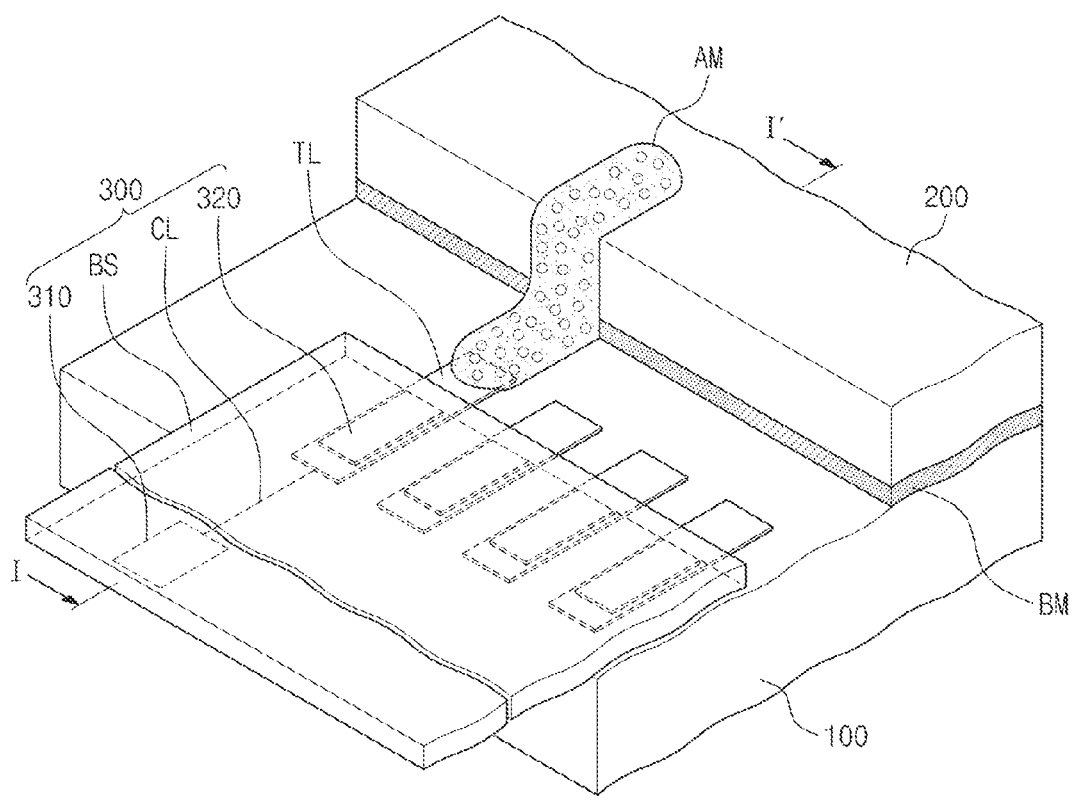
FIG. 2 is an enlarged view showing a first portion of a pad part included in the liquid crystal display shown in FIG. 1.
Figure 3:
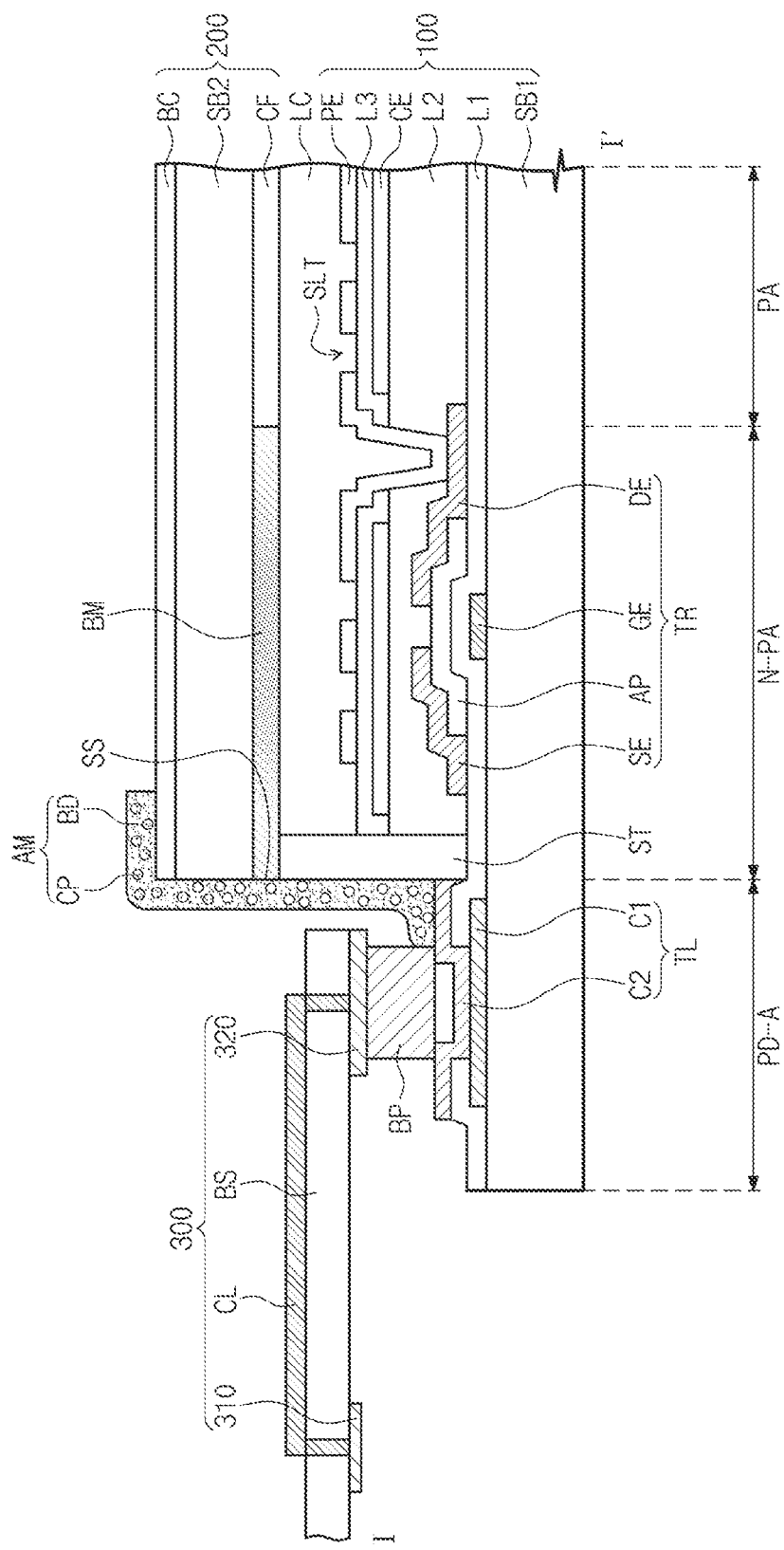
FIG. 3 is a cross-sectional view taken along a line I-I' of FIG. 2.

FIG. 1 is a perspective view showing a liquid crystal display 500 according to an exemplary embodiment of the present disclosure, FIG. 2 is an enlarged view showing a portion A1 of a pad part PD included in the liquid crystal display 500 shown in FIG. 1, and FIG. 3 is a cross-sectional view taken along a line I-I' of FIG. 2. In the exemplary embodiment shown in FIGS. 1 and 2, the liquid crystal display 500 includes a plurality of pixels, however, only one pixel will be shown in FIG. 3 as a representative example since the pixels have the same structure and use, and thus detailed descriptions of the other pixels will be omitted.

Referring to FIGS. 1, 2, and 3, the liquid crystal display 500 includes an array substrate 100, an opposite substrate 200, a liquid crystal layer LC interposed between the array substrate 100 and the opposite substrate 200, a printed circuit board 300, and a conductive member AM.

The array substrate 100 includes a first base substrate SB1, a thin film transistor TR, a pixel electrode PE, and a common electrode CE. The first base substrate SB1 may be, but is not limited to, a substrate having a light transmissive property, such as a glass substrate or a plastic substrate. When the plastic substrate is used as the first base substrate SB1, the first base substrate SB1 may be flexible.

The thin film transistor TR is disposed in a non-pixel area N-PA of the first base substrate SB1, and the thin film transistor TR is electrically connected to the pixel electrode PE to switch a driving signal applied to the pixel electrode PE.

The thin film transistor TR includes a gate electrode GE, a semiconductor pattern AP, a source electrode SE, and a drain electrode DE. The gate electrode GE is disposed on the first base substrate SB1, the semiconductor pattern AP is disposed on the gate electrode GE, and a first insulating layer L1 is disposed between the gate electrode GE and the semiconductor pattern AP. The source electrode SE is disposed on the semiconductor pattern AP, and the drain electrode DE is disposed on the semiconductor pattern AP and spaced apart from the source electrode SE.

In the illustrated embodiment, the semiconductor pattern AP may include silicon, but a semiconductor material included in the semiconductor pattern AP should not be limited thereto or thereby. For instance, the semiconductor pattern AP may include an oxide semiconductor material, such as, IGZO, ZnO, $SnO_2$, $IN_2O_3$, $Zn_2SnO_4$, $GeO_3$, and/or $HfO_2$.

A second insulating layer L2 covers the thin film transistor TR and the common electrode CE is disposed on the second insulating layer L2. The common electrode CE may include a conductive material having a light transmissive property, such as: indium tin oxide, indium zinc oxide, etc.

A third insulating layer L3 is disposed on the common electrode CE, and the pixel electrode PE is disposed on the third insulating layer L3. The pixel electrode PE is disposed in a pixel area PA of the first base substrate SB1 and insulated from the common electrode CE by the third insulating layer L3.

A plurality of slits SLT is formed through the pixel electrode PE. Thus, a horizontal electric field may be formed between the pixel electrode PE and the common electrode CE and may transmit through the slits SLT. An alignment direction of liquid crystal molecules of the liquid crystal layer LC is controlled by the horizontal electric field.

The opposite substrate 200 is coupled to the array substrate 100 by a coupling member ST disposed in the non-pixel area N-PA. The opposite substrate 200 includes a second base substrate SB2, a light blocking layer BM, a color filter CF, and a rear-surface conductive layer BC.

The second base substrate SB2 faces the first base substrate SB1. Similar to the first base substrate SB1, the second base substrate SB2 may be, but is not limited to, a glass substrate or a plastic substrate, which may have a light transmissive property.

The light blocking layer BM is disposed on the second base substrate SB2 in an area corresponding to the non-pixel area N-PA and, thus, blocks a light traveling thereto. For instance, in a case in which the liquid crystal display 500 includes a backlight unit (not shown) generating light to the array substrate 100 and the opposite substrate 200, the light blocking layer BM may block the light incident thereto from the backlight unit (not shown).

The light blocking layer BM may not be in direct contact with the common electrode, but may be in direct contact with the liquid crystal layer LC.

The light blocking layer BM may include a metal material. For instance, the light blocking layer BM may include chromium or a chromium-based alloy, but the material included in the light blocking layer BM should not be limited thereto or thereby. That is, the light blocking layer BM may include an organic material or other materials.

The color filter CF is disposed on the second base substrate SB2 in an area corresponding to the pixel area PA. The light emitting from the backlight unit (not shown) may be filtered into a colored light by passing through the color filter CF.

The rear-surface conductive layer BC is disposed on the second base substrate SB2 and faces the light blocking layer BM and the color filter CF such that the second base substrate SB2 is disposed between the rear-surface conductive layer BC and the light blocking layer BM and between the rear-surface conductive layer BC and the color filter CF. The rear-surface conductive layer BC may be, but is not limited to, a conductive layer having a light transmissive property, including indium tin oxide, indium zinc oxide, etc.

The rear-surface conductive layer BC is formed in a single-layer structure and is disposed on the second base substrate SB2 in both the non-pixel area N-PA and the pixel area PA. Details of the rear-surface conductive layer BC will be described below.

As described above, the alignment direction of the liquid crystal molecules included in the liquid crystal layer LC is controlled by the horizontal electric field. The pixel electrode PE and the common electrode CE, which generate the horizontal electric field, are disposed on the first base substrate SB1. That is, the array substrate 100 includes electrodes to control the alignment direction of the liquid crystal molecules included in the liquid crystal layer LC, and the opposite substrate 200 does not include such electrodes.

Unlike exemplary embodiments of the present invention, in a case that the opposite substrate 200 does not include the rear-surface conductive layer BC, it may be difficult to discharge electric charges built up in the opposite substrate 200 to the outside of the opposite substrate 200, since the opposite substrate 200 includes no electrode. Specifically, the electric charges may be built up in the opposite substrate 200 while the opposite substrate 200 is iii manufactured before the array substrate 100 is coupled to the opposite substrate 200. In this case, since the opposite substrate 200 does not include the rear-surface conductive layer BC, it may be difficult to discharge the electric charges charged in the opposite substrate 200 to the outside of the opposite substrate 200.

However, according to the present exemplary embodiment, the opposite substrate 200 includes the rear-surface conductive layer BC, and thus, the electric charges built up in the opposite substrate 200 may be discharged to the outside of the opposite substrate 200 using the rear-surface conductive layer BC. More particularly, the electric charges built up in the opposite substrate 200 may be discharged to the outside of the opposite substrate 200 through the rear-surface conductive layer BC by grounding the rear-surface conductive layer BC.

The printed circuit board 300 is electrically connected to the array substrate 100 to apply a driving signal to the array substrate 100. The printed circuit board 300 is electrically connected to a pad part PD defined in a pad area PD-A of the array substrate 100.

In the present exemplary embodiment, the printed circuit board 300 includes a base film BS, output terminals 320 disposed on the base film BS, and a ground terminal 310, and the pad part PD includes input terminals TL electrically connected to the output terminals 320 in a one-to-one correspondence. That is, one output terminal of the output terminals 320 is electrically connected to one input terminal of the input terminals TL and electrically connected to the ground terminal 310 through a conductive line CL. The other output terminals of the output terminals 320 are electrically connected to the other input terminals of the input terminals TL in a one-to-one correspondence to allow the driving signal generated by a driving chip 350 to be applied to the array substrate 100.

The conductive member AM electrically connects the light blocking layer BM to the ground terminal 310. The conductive member AM extends along a side portion of the opposite substrate 200 to make contact with a side surface SS of the light blocking layer BM. The conductive member AM is electrically connected to the input terminal, which is electrically connected to the ground terminal 310.

As described above, when the conductive member AM extends along the side portion of the opposite substrate 200, the conductive member AM contacts the side surface SS of the light blocking layer BM since the light blocking layer BM is exposed to the outside of the pad part PD.

Hereinafter, the one output terminal 320 among the output terminals 320 that is electrically connected to the ground terminal 310, one input terminal TL among the input terminals TL electrically connected to the output terminal 320, and the conductive member AM will be described in detail.

The input terminal TL includes a first conductive layer C1 and a second conductive layer C2 electrically connected to the first conductive layer C1. The second conductive layer C2 contacts the first conductive layer C1 through a via hole formed through the first insulating layer L1, which is interposed between the first conductive layer C1 and the second conductive layer C2. The first conductive layer C1 may include the same material as that of the gate electrode GE, and the second conductive layer C2 may include the same material as that of the source electrode SE and the drain electrode DE.

The input terminal TL is electrically connected to the output terminal 320 by a bump BP provided between the input terminal TL and the output terminal 320. The output terminal 320 is electrically connected to the ground terminal 310 by the conductive line CL. The conductive member AM makes contact with the input terminal TL and is electrically connected to the input terminal TL. Thus, the light blocking layer BM is electrically connected to the ground terminal 310 through the conductive member AM.

According to the above-mentioned structure of the conductive member AM, an electrostatic charge built up in the light blocking layer BM may be discharged to the ground terminal 310 sequentially through the conductive member AM, the input terminal TL, the bump BP, the output terminal 320, and the conductive line CL. When the electrostatic charge charged in the light blocking layer BM and the rear-surface conductive layer BC may be discharged to the ground terminal 310 by using the conductive member AM, a static electricity generated in the liquid crystal display 500 due to the electrostatic charge may be reduced. This may prevent components in the liquid crystal display 500 from being damaged by the static electricity.

The conductive member AM includes a plurality of conductive particles CP and a binder BD in which the conductive particles CP are dispersed. The binder BD may include a resin and the conductive particles CP may include silver (Ag), but these are merely exemplary and exemplary embodiments of the present invention are not limited to these materials.

The conductive member AM makes contact not only with the light blocking layer BM but also with the rear-surface conductive layer BC. Accordingly, the electrostatic charge built up in the rear-surface conductive layer BC may be discharged to the ground terminal 310 through the conductive member AM.

Figure 4A:
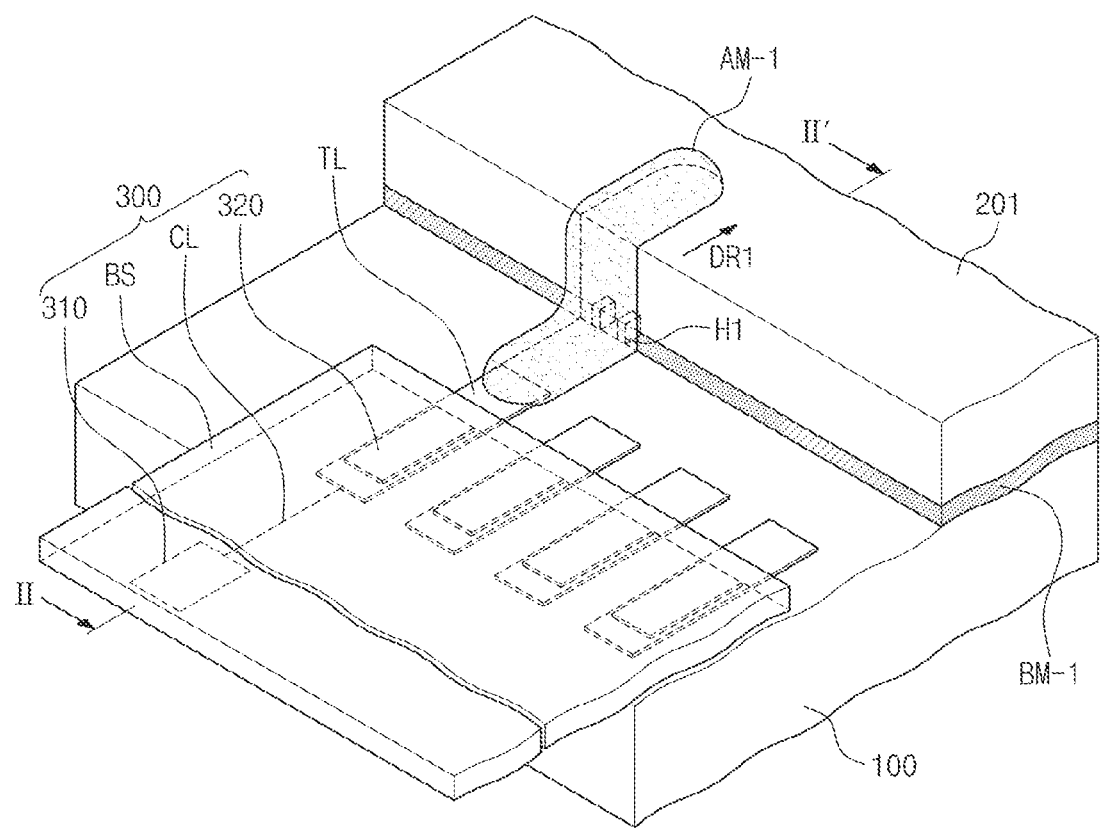
FIG. 4A is a perspective view showing a portion of a display device according to an exemplary embodiment of the present disclosure.
Figure 4B:
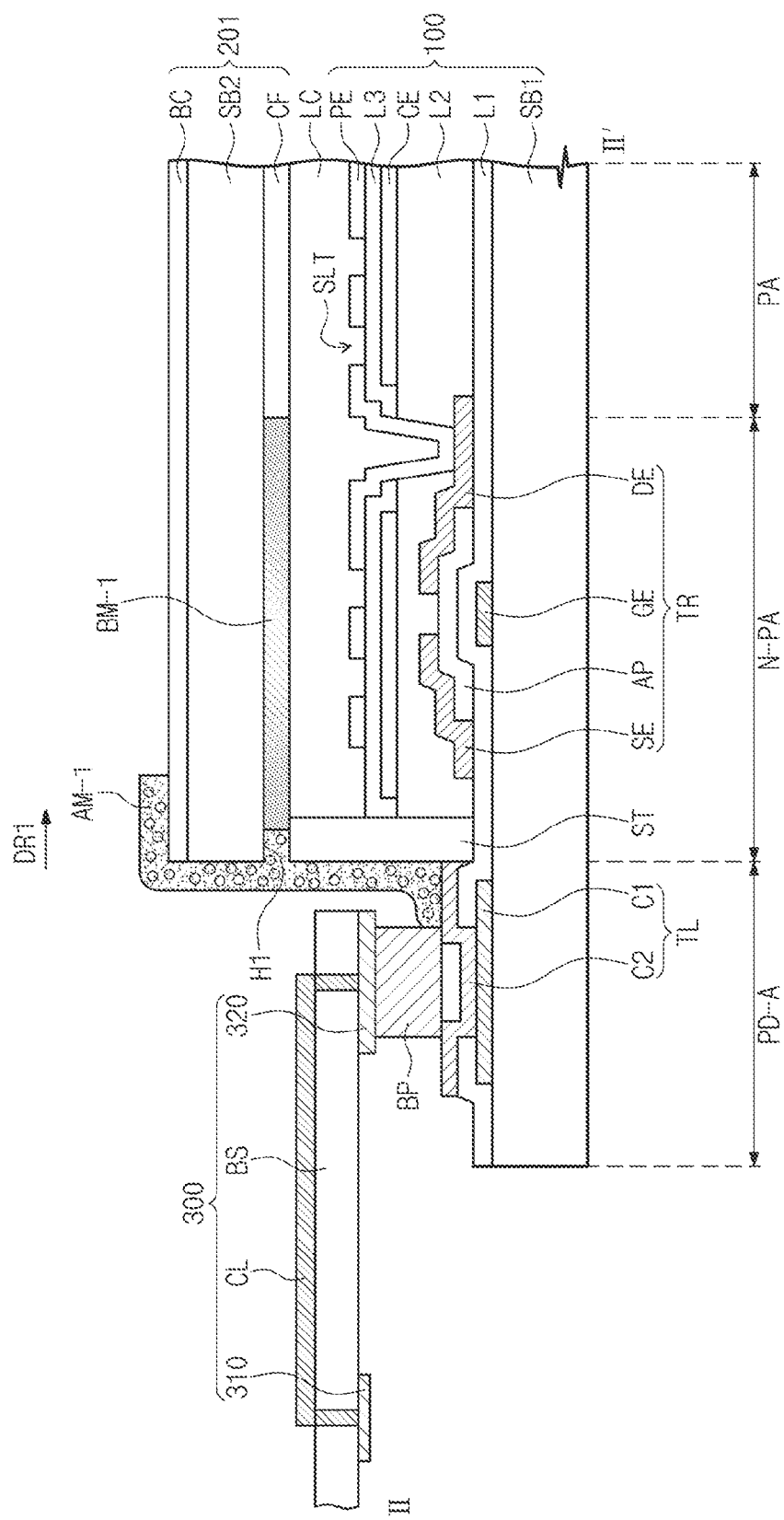
FIG. 4B is a cross-sectional view taken along a line II-II' of FIG. 4A.

FIG. 4A is a perspective view showing a portion of a display device 501 according to another exemplary embodiment of the present disclosure and FIG. 4B is a cross-sectional view taken along a line II-II' of FIG. 4A. In FIGS. 4A and 4B, the same reference numerals denote the same elements of FIGS. 1, 2, and 3, and thus, the detailed descriptions of the same elements will be omitted.

Referring to FIGS. 4A and 4B, a display device includes an array substrate 100, an opposite substrate 201, and a conductive member AM-1.

A portion of the conductive member AM-1 is disposed between the array substrate 100 and the opposite substrate 201. More particularly, an edge portion of a light blocking layer BM-1 is partially removed to form grooves H1 in the light blocking layer BM-1. A depth direction of each of the grooves H is substantially in parallel to a first direction DR1. That is, the conductive member AM-1 extends along from an upper portion of the opposite substrate 201 to a side portion of the opposite substrate 201, and a portion of the conductive member AM-1 is accommodated in the grooves H1 of the light blocking layer BM-1.

Since the conductive member AM-1 is partially accommodated in the grooves H1, the conductive member AM-1 makes contact with surfaces defining the grooves H1, and thus, a contact area between the conductive member AM-1 and the light blocking layer BM-1 increases. Therefore, electric charges built up in the light blocking layer BM-1 may be discharged to the outside of the light blocking layer BM-1 through the conductive member AM-1.

Figure 5:
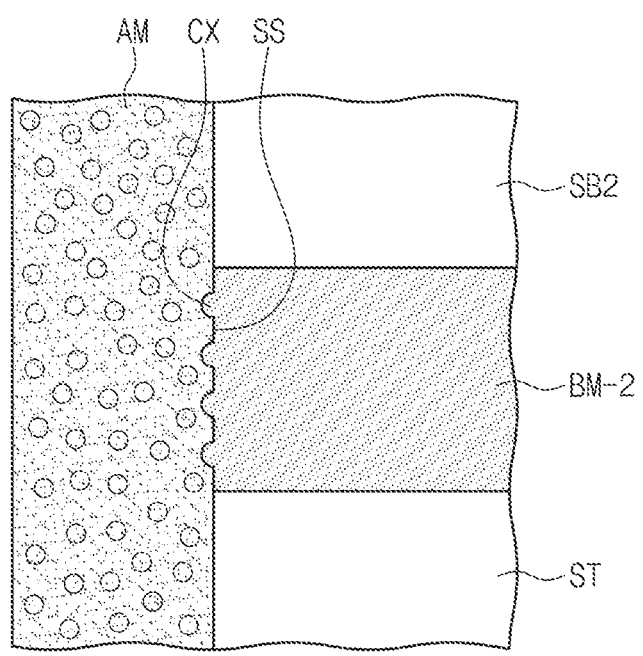
FIG. 5 is a cross-sectional view showing a display device according to an exemplary embodiment of the present disclosure.

FIG. 5 is a cross-sectional view showing a display device according to another exemplary embodiment of the present disclosure. FIG. 5 shows a cross section of a light blocking layer BM-2 making contact with a conductive member AM. In FIG. 5, the same reference numerals denote the same elements shown in previous embodiments, and thus, the detailed descriptions of the same elements will be omitted.

Referring to FIG. 5, a side surface SS of the light blocking layer BM-2 makes contact with the conductive member AM, and a plano-convex pattern CX, which is defined by protrusions and recesses, is formed on the side surface SS. Accordingly, a contact area between the light blocking layer BM-2 and the conductive member AM increases by the plano-convex pattern CX, and thus electric charges built up in the light blocking layer BM-2 may be discharged to the outside of the light blocking layer BM-2 through the conductive member AM. Pattern CX may not be limited to plano-concave shape, but may include any undulated or non-planar shape that may increase the contact surface between such areas.

Although the exemplary embodiments of the present disclosure have been described, it is understood that the present disclosure should not be limited to these exemplary embodiments but various changes and modifications can be made by one ordinary skilled in the art within the spirit and scope of the present disclosure as hereinafter claimed.

What is claimed is:

1. A display device, comprising:
    an array substrate comprising a pixel electrode and a common electrode;
    an opposite substrate facing the array substrate and coupled with the array substrate;
    a liquid crystal layer interposed between the array substrate and the opposite substrate and comprising a plurality of the liquid crystal molecules, an alignment direction of the liquid crystal molecules is controlled by a horizontal electric field which is formed between the pixel electrode and the common electrode;
    a printed circuit board comprising a ground terminal and an output terminal and applying a driving signal to the array substrate through the output terminal; and
    a conductive member electrically coupling the light blocking layer to the ground terminal,
    wherein the opposite substrate comprises;
        a base substrate;
        a light blocking layer disposed on a base substrate corresponding to a non-pixel area of the array substrate; and
        a rear-surface conductive layer disposed on the base substrate and facing the light blocking layer,
        wherein the base substrate is disposed between the light blocking layer and the rear-surface conductive layer, and
        wherein the conductive member extends along a side portion of the opposite substrate and contacts a side surface of the light blocking layer and the rear-surface conductive layer.

2. The display device of claim 1, wherein the light blocking layer comprises a metallic material.

3. The display device of claim 1, wherein the light blocking layer comprises an organic material.

4. The display device of claim 1, wherein the array substrate further comprises a pad part comprising an input terminal electrically coupled to the output terminal, and
    wherein the conductive member contacts the input terminal, the input terminal being electrically coupled to the ground terminal.

5. The display device of claim 4, wherein the light blocking layer is exposed to outside.

6. The display device of claim 1, wherein the side surface of the light blocking layer comprises a non-planar shape in a region contacting the conductive member.

7. The display device of claim 6, wherein the non-planar shape is plano-convex.

8. The display device of claim 6, wherein the non-planar shape is undulated shape.

9. The display device of claim 1, wherein the conductive member extends along a side portion of the opposite substrate and a portion of the conductive member is disposed between the array substrate and the opposite substrate.

10. The display device of claim 1, wherein the conductive member comprises conductive particles.

11. The display device of claim 10, wherein the conductive particles comprise silver (Ag).

12. The display device of claim 1, wherein the array substrate further comprises:
    thin film transistors respectively electrically connected to the pixel electrodes;
    a first insulating layer disposed on and covering the common electrode; and
    a second insulating layer disposed on and covering the thin film transistors, the common electrode disposed on the second insulating layer, and the pixel electrodes disposed on the first insulating layer.

13. The display device of claim 10, wherein a slit is disposed in each of the pixel electrodes.

14. The display device of claim 1, wherein the light blocking layer directly contacts the liquid crystal layer.

* * * * *